United States Patent Office 3,073,834
Patented Jan. 15, 1963

3,073,834
PROCESS FOR PREPARING THE CYANO AND CARBOXY SUBSTITUTED DERIVATIVES OF 2-PIPERIDINONE AND 2-PYRROLIDINONE
Newman M. Bortnick, Oreland, and Marian F. Fegley, Mont Clare, Pa., assignors to Rohm & Haas Company, Philadelphia, Pa., a corporation of Delaware
No Drawing. Filed June 8, 1960, Ser. No. 34,636
6 Claims. (Cl. 260—294)

This invention deals with a method for the preparation of specific substituted pyrrolidinones and piperidinonones.

The method of the present invention deals with the preparation of specific substituted pyrrolidinones and piperidinones by reacting a compound having the formula

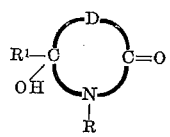

with hydrocyanic acid. In the above formula, the symbol R represents a hydrogen atom, an alkyl group of the one to eighteen carbon atoms, an aryl group of up to ten carbon atoms, an aralkyl group of up to twelve carbon atoms, an alkarylalkyl group of up to twenty carbon atoms, an alkoxyalkyl group of three to ten carbon atoms, and an alkylaminoalkyl group of three to eighteen carbon atoms provided that the amino group is a secondary or tertiary structure, that is, non-primary. Alkyl, in the above definition, is to be construed to include cycloalkyl and alkylcycloalkyl within the range of carbon atoms previously set forth.

Typical R representations are hydrogen, methyl, ethyl, butyl, octyl, decyl, dodecyl, octadecyl, cyclopentyl, cyclohexyl, phenyl, naphthyl, benzyl, phenylethyl, methylphenyl, methoxyethyl, methoxypropyl, propoxyethyl, butoxyethyl, pentoxyethyl, N,N-dimethylaminoethyl, N,N-dipropylaminopropyl, morpholinopropyl, and pyrrolidinoethyl.

The symbol $R^1$ represents hydrocarbon groups of one to ten carbon atoms, preferably alkyl, arylalkyl, cycloalkyl, aryl, and alkaryl. $R^1$ may typically represent methyl, butyl, octyl, benzyl, phenylbutyl, cyclopentyl, cyclohexyl, phenyl, naphthyl, butylphenyl groups, and the like.

D is a divalent chain containing two to three carbon atoms. The carbon atoms in the D chain may have their remaining valences satisfied by hydrogen atoms, by alkyl groups whose total carbon atom content is not greater than 18, or by combinations of hydrogen atoms and alkyl groups. When D contains two carbon atoms, there are four valences to be satisfied by hydrogen atoms, alkyl groups, or combinations thereof. For instance, there may be four hydrogen atoms, four alkyl groups, three hydrogen atoms and one alkyl group, two hydrogen atoms and two alkyl groups, or one hydrogen atom and three alkyl groups. When D contains three carbon atoms, there are six valences to be satisfied by hydrogen atoms, alkyl groups, or combinations thereof and these valences may be satisfied in a way analogous to the manner described above when D contains two carbon atoms. It is also possible for the above-mentioned alkyl substituents to be joined together to form carbocyclic rings in conjunction with the D chain. When the D chain contains three carbon atoms, $R^1$ may represent a hydrogen atom in addition to the representations previously given.

The alkyl substituents on the carbon atoms of the D chain may have any possible spatial configurations, such as normal, iso, tertiary, and the like. These alkyl substituents may also be straight chained or cyclic. Typical of the alkyl substituents that may be used to satisfy the remaining valences of the carbon atoms in the D chain include methyl, ethyl, propyl, butyl, cyclopentyl, hexyl, cyclohexyl, octyl, decyl, dodecyl, tridecyl, tetradecyl, and octadecyl groups.

Typical of the specific substituted pyrrolidinones and piperidinones that may be employed as reactants in the present invention are 4,5-dimethyl - 5 - hydroxy - 2 - pyrrolidinone, 7a-hydroxy-3,3-pentamethylene-2,3,3a,4,5,6,7, 7a-octahydroindol - 2 - one, 3 - methyl - 3,5 - dipropyl-5-hydroxy-2-pyrrolidinone, 1,(2-phenyl-ethyl) - 3,3,5 - trimethyl-5-hydroxy-2-pyrrolidinone, 3,3,5-trimethyl - 5 - hydroxy-2-pyrrolidinone, 3,5-dimethyl-3-neopentyl - 5 - hydroxy-2-pyrrolidinone, 1-(3 - diethylaminopropyl) - 3,3,5-trimethyl-5-hydroxy - 2 - pyrrolidinone, 1 - (2 - dimethylaminoethyl)-3,3,5-trimethyl-5-hydroxy - 2 - pyrrolidinone, 1-benzyl-3,3,5-trimethyl - 5 - hydroxy - 2 - pyrrolidinone, 1-p-tolyl-3,3,5-trimethyl - 5 - hydroxy - 2 - pyrrolidinone, 1-(3-dimethylaminopropyl)-3,5-dimethyl - 3 - neopentyl-5-hydroxy-2-pyrrolidinone, 1 - (3 - methoxypropyl)-3,3,5-trimethyl-5-hydroxy - 2 - pyrrolidinone, 3,5 - dimethyl - 3-hexyl-5-hydroxy-2-pyrrolidinone, 1 - dodecyl - 3,3,5 - trimethyl-5-hydroxy-2-pyrrolidinone, 3,6-dimethyl - 3-(2,2-dimethylpropyl)-6-hydroxy-2-piperidinone, 1-methyl-3,6-dipropyl-6-hydroxy-2-piperidinone, 1,3,3,6-tetramethyl-6-hydroxy - 2 - piperidinone, 1 - (2 - dimethylaminoethyl)-3,3,6-trimethyl - 6 - hydroxy - 2 - piperidinone, 3,3,6-trimethyl-6-hydroxy-2-piperidinone, 3,6-dimethyl - 3 - neopentyl-6-hydroxy-2-piperidinone, 3,6-dihexyl - 3 - methyl-6-hydroxy-2-piperidinone, 1-p-tolyl-3,3,6-trimethyl-6 - hydroxy-2-piperidinone, 1,5,5-trimethyl-6 - hydroxy - 2 - piperidinone, 5,5-dimethyl-4-ethyl-6 - hydroxy - 2 - piperidinone, 3,6-di - (2 - methylpropyl) - 3 - methyl - 6 - hydroxy-2-piperidinone, 1-(2-diethylaminoethyl) - 5,5 - dimethyl-6-hydroxy - 2 - piperidinone, 3,4 - dimethyl-3-hexyl-6-hydroxy-2-piperidinone, 5,5 - dimethyl-6-hydroxy-2-piperidinone, spiro{3,3-dimethylbicyclo(2.2.1)heptane-2,3'-[6'-methyl-6'-hydroxy-2'-piperidinone]}, 3,4,4 - trimethyl-6-hydroxy - 2 - piperidinone, 3,5,5 - trimethyl - 6-hydroxy - 2 - piperidinone, 3,6 - dibutyl - 5 - methyl-6-hydroxy-2-piperidinone.

The piperidinone and pyrrolidinone reactants employed in the present process may be obtained by cyclization of γ- and δ-oxonitriles. It is possible to start with γ- and δ-oxonitriles and, by cyclization and hydration, obtain the corresponding 5-hydroxy-2-pyrrolidinone and 6-hydroxy-2-piperidinone reactants. The products of this invention may then be derived by reaction wtih hydrogen cyanide in the presence of an alkali to be more fully described hereinafter. Thus, it is possible to go from the γ-oxonitriles and δ-oxonitriles to the specific 2-pyrrolidinones and 2-piperidinones of this invention in a rather continuous way without the necessity of separating or purifying the 5-hydroxy-2-pyrrolidinones or 6-hydroxy-2-piperidinones, It is, of course, generally desirable, from the viewpoint of yields, to employ as reactants the specific pyrrolidinones and piperidinones discussed heretofore.

The present compounds are prepared by reacting specific pyrrolinones with hydrocyanic acid. The present reaction may be conducted at atmospheric pressure in the temperature range of about 0° to 100° C. or under superatmospheric pressure at temperatures as high as 325° C. At high temperatures, the ambient pressure must be sufficient to maintain the reactants in the liquid phase. It may be conducted in neutral, acidic, or basic medium. The medium which is preferred will depend upon the nature of the substituent attached at the 1-position. When the present reaction is conducted in the presence of a cyanide ion generating catalyst, the catalyst is employed preferably in amounts of about 0.1 to 20% by weight of the total weight of the reactants. Suitable as a catalyst are alkali metals and their carbonates, the lower alkoxides, oxides, hydroxides, peroxides, and cyanides of the alkali metals and alkaline earth metals, tertiary amines, and quaternary ammonium bases. Actually there may be employed as catalyst any base whose aqueous 0.1 molar solution has a pH of about at least 9. Typical examples of the catalyst that may be used are sodium, potassium, lithium, sodium methoxide, potassium butoxide, lithium ethoxide, magnesium ethoxide, sodium oxide, potassium hydroxide, calcium oxide, barium hydroxide, strontium hydroxide, sodium peroxide, magnesium peroxide, potassium cyanide, lithium cyanide, barium cyanide, magnesium cyanide, sodium carbonate, potassium carbonate, trimethylamine, triethylamine, triethanolamine, octyldimethylamine, N-methylmorpholine, benzyltrimethylammonium hydroxide, dibenzyldimethyl ammonium hydroxide, dodecenyltriethylammonium hydroxide, and the like. The alkali metal cyanides are particularly effective for the instant purposes.

The catalyst may be added to the reaction mixture all at once or intermittently as desired. The hydrocyanic acid may be added all at once but preferably is introduced at a rate sufficient to maintain a constancy of reaction conditions. Also, both the catalyst and the reactants may be added all at once or intermittently as desired. The advantages of the above refinements will be apparent to one skilled in the art from the teachings of the present invention.

It is preferred to introduce the hydrocyanic acid to a mixture of the catalyst and the pyrrolidinone or the piperidinone, as the case may be, at a gradual rate, so that the reaction occurs promptly after the two reactants and the catalyst meet under the defined conditions, preferably with the pyrrolidinone or piperidinone in some excess. Under such arrangements, there is substantially no polymerization of hydrocyanic acid and yields of the desired product are very high.

In the present invention, hydrocyanic acid may be introduced into the reaction mixture in either the gaseous or liquid state.

The rate of addition of hydrocyanic acid varies with the temperatures at which the reactions are carried out. When high temperatures are employed, reaction times may be shortened from hours to minutes, particularly when high molecular weight pyrrolidinone and piperidinone starting materials are employed.

If desired, a solvent can be employed in carrying out the addition of hydrocyanic acid to the defined pyrrolidinones and piperidinones. This solvent may be of the hydrocarbon type such as hexane, heptane, benzene, toluene, and the like, or it may be selected from the class of secondary and tertiary alcohols, ethers, substituted amides, nitriles and halogenated hydrocarbons, as desired.

In some cases, it may be that the catalyst is not substantially or entirely soluble in the reaction system. In these instances particularly, it is desirable to agitate the reaction system such as by stirring or rocking in order to assure highest activity from the catalyst. Reactants in this invention, when combined in substantially equimolecular amounts give cyanopyrrolidinones and cyanopiperidinones in yields that consistently reach 75% and more. At the conclusion of the reaction, the catalyst is neutralized by the addition of acid or base, depending on which type has been employed. The reaction mixture may then be filtered, if desired, and then the solvent, if any can be removed at reduced pressure. If further purification of the product is desired, recrystallization from an appropriate solvent is preferred.

The products of this invention have known utilities in the analgesic field, among others.

The process of this invention may be more fully understood from the following examples which are offered by way of illustration and not by way of limitation. Parts by weight are used throughout.

*Example 1*

A mixture of 40 parts of 5-hydroxy-3,3,5-trimethyl-2-pyrrolidinone and 2 parts of sodium hydroxide in 70 parts of dimethylformamide is heated to 120° C. The mixture is stirred and heated to 120° C. and 20 parts of hydrogen cyanide is added dropwise over a period of one hour while the temperature is maintained at 112° to 120° C. This temperature is maintained in this range for a half hour after the addition is completed. The mixture is filtered and the residue taken up in benzene. After decolorizing with Nuchar and recrystallization from benzene and heptane, the product melts at 160° to 166° C. After further recrystallization from acetone, the product melts at 164° to 167° C. On analysis it is found to contain 62.9% carbon, 8.06% hydrogen, and 18.0% nitrogen. It is identified as mesitilonitrile or 5-cyano-3,3,5-trimethyl-2-pyrrolidinone. The theoretical values for this compound are 63.1% carbon, 7.95% hydrogen, and 18.4% nitrogen.

*Example 2*

A mixture containing 75 parts of 5-hydroxy-3,3,5-trimethyl-2-pyrrolidinone and 30.5 parts of sodium cyanide in 80 parts of water is heated with stirring at 80° to 103° C. for 3 and a half hours. During this time, 4.9 parts of ammonia is liberated. Twenty parts of a solid is separated by filtration. After recrystallization from ethanol, it melts at 220.5% to 222° C. It is found to contain 15.1% nitrogen and is identified as mesitilamide or 5-amido-3,3,5-trimethyl-2-pyrrolidinone. The theoretical value for this compound is 16.4% nitrogen.

The filtrate from this reaction mixture is stripped at reduced pressure to remove the bulk of the water. Chloroform is added and the mixture is acidified with anhydrous hydrogen chloride. A solid, which separates on acidification after recrystallization from acetone, gives 19.5 parts of mesitilic acid.

*Example 3*

A solution of 31 parts of sodium cyanide and 70 parts of 5-hydroxy-3,3,5-trimethyl-2-pyrrolidinone in 150 parts of water is heated at 75° to 85° C. for 20 hours. A viscous liquid remains after the bulk of the water is removed by stripping at reduced pressure. This gives an emulsion when it is stirred with chloroform. Anhydrous chloride is bubbled into this emulsion. Ninety-two parts of moist solid is separated by filtration of the acidified emulsion. Two recrystallizations from acetone yield 42.2 parts of a solid which melts at 173° to 175° C. It is found to contain 8.0% nitrogen and has a neutral equivalent of 175. It is identified as mesitilic acid. The theoretical values for this compound are 8.18% nitrogen and a neutral equivalent of 171.2.

*Example 4*

2,2-dimethyl-4-oxopentanenitrile (mesitononitrile), 85 parts, is added dropwise to a stirred solution of 36 parts of sodium cyanide in 71 parts of water while maintaining the reaction temperature at 63° to 100° C. The vent gases are flushed through a gas scrubbing bottle. During the one hour addition period, 4.25 parts of ammonia are liberated. After a one and a half hour reaction period at 114° C., a total of 8.5 parts of ammonia evolves. At this time, 25 parts of water and 4 parts of sodium hydroxide are added and the material is maintained at 112° C. for an additional four and a half hours. A total of 10.7 parts of ammonia is liberated. The cold reaction mixture is neutralized with anhydrous hydrogen chloride and filtered. The residue is extracted twice with boiling acetone. 71.5 parts of product is identified as mesitilic acid. It is found to contain 8.2% nitrogen.

Similarly, a solution of 63 parts of mesitononitrile and 31 parts of sodium cyanide in 140 parts of water is held at 60° to 74° C. for 2½ hours and gives a mixture of mesitilonitrile, mesitilamide and mesitilic acid.

Example 5

A solution of 1 part of 5,5-dimethyl-6-hydroxy-2-piperidinone in 6 parts of dimethylformamide is treated with about .6 part of HCN and 0.1 part of sodium methoxide. The material is allowed to stand for 18 hours at room temperature. The dimethylformamide is stripped by means of a rotating vacuum evaporator to a final vacuum of 0.4 mm. The remaining solution is filtered to remove the sodium methoxide. Although both starting material and dimethylformamide remain, the presence of a nitrile bond in the infrared spectrum shows that the desired product, 6-cyano-5,5-dimethyl-2-piperidinone, is formed.

Example 6

A solution of 31 parts of 3,3,5-trimethyl-5-methoxy-2-pyrrolidinone, 10 parts of sodium cyanide, and 73 parts of methanol is heated to reflux and maintained at 50° to 65° C. for two and a quarter hours. The material is cooled in an ice bath as a slow stream of anhydrous hydrogen chloride is bubbled through until it is just weakly alkaline, three hours. The material is filtered. The filtrate is treated for about three minutes with hydrogen chloride until it is neutral and refiltered. The residue is washed with methanol. The methanol is stripped from the combined filtrate under reduced pressure. The residue, 25 parts, gives 8.7 parts of mesitilonitrile, M.P. 158° to 162° C. after recrystallization from a benzene-heptane mixture. After a recrystallization from acetone, 8.6 parts of material, M.P. 165° to 167° C., are isolated.

In a similar manner, 6.5 parts of sodium cyanide and 21 parts of 5-methoxy-3,3,5-trimethyl-2-pyrrolidinone in 97 parts of dimethylformamide are heated with stirring at 110° C. for three and one half hours. Examination of the infrared spectrum of the crude product after the dimethylformamide has been removed by stripping at reduced pressure shows that the bulk of the material has been converted to mesitilonitrile.

There are introduced into a 125 ml. Aminco bomb 7.8 parts of mesitilonitrile, 35 parts of methanol, and 5 parts of Raney nickel catalyst. Hydrogen is absorbed when this is heated at 130° to 170° C. for 7 hours under hydrogen at 1000 p.s.i.g. The reaction mixture is filtered and the methanol is distilled at reduced pressure. The crude product is found to contain 61.7% carbon, 10.38% hydrogen, and 15.5% nitrogen and has a neutral equivalent of 187. It is identified as 5-aminomethyl-3,3,5-trimethyl-2-pyrrolidinone. This compound requires 61.5% carbon, 10.3% hydrogen, 17.9% nitrogen, and a neutral equivalent of 156.

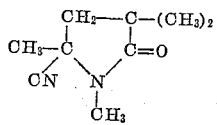

is similarly prepared from

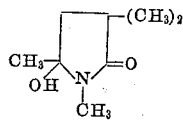

and hydrocyanic acid.

The product has a boiling point of 77±2° C./05 mm., melting point of 48° to 49° C., and an $n_D^{25}$ of 1.4614 as the supercooled liquid.

Example 7

A solution of 14 parts of sodium cyanide and 51.5 parts of 1-(2-oxocyclohexyl)-cyclohexanecarbonitrile in 150 parts of redistilled tetrahydrofurfuryl alcohol is heated with stirring at 90° to 100° C. for four hours. There is no detectable liberation of ammonia during this time. A solution is acidified with anhydrous hydrogen chloride. A solid which separates is removed by filtration; a second crop melts at 152° to 164° C. This combined solid is extracted with acetone to separate the organic material from the sodium chloride. The dark yellow organic material, which precipitates when heptane is added to the acetone solution, is taken up in acetone, decolorized with Norite and reprecipitated with heptane. It is found to contain 71.9% carbon, 8.42% hydrogen, and 11.55% nitrogen. It is identified as spiro[cyclohexane-1,3'(2',3',3'a,4',5',6',7',7'a)-octahydro-7'a-cyano-2'-oxindol]. This compound requires 72.37% carbon, 8.68% hydrogen, and 12.06% nitrogen.

The compounds concerned in the present invention may be represented by the formula

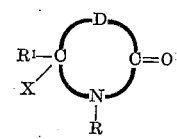

in which X is either of the groups —CN or —COOM in which M is an alkali metal. A method for making the compounds wherein X is a cyano group has already been discussed. If one desires to make a corresponding salt wherein X stands for the group —COOM, there is employed as a reactant the compound

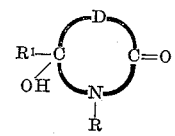

This hydroxy compound is reacted with an alkali metal cyanide, such as sodium, potassium, or lithium cyanide in an aqueous medium. The medium may be entirely water or water and an inert volatile organic solvent. The reaction is conducted in the range of 30° to 150° C., preferably 70° C., to the atmospheric reflux temperature of the reaction medium. At temperatures appreciably above about 100° C., it is necessary to employ superatmospheric pressures. The reaction is conducted until the evolution of ammonia terminates. It is also possible to convert the salt to the acid form by acidulating with a mineral acid, such as hydrochloric or sulfuric or acetic acid, or the like, as will be apparent to one skilled in the art.

If desired, it is possible to proceed from the compound where X is the hydroxyl group to where X may represent an amide group by carefully controlling the amount of aqueous alkali metal cyanide employed.

We claim:

1. A method for the preparation of a compound having the formula

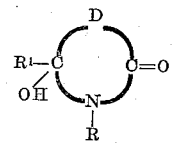

which comprises bringing together and thereby reacting at a temperature of about 0 to 325° C. the compound having the formula

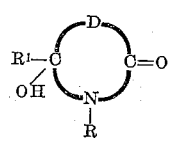

with hydrocyanic acid, in which R is a member of the group consisting of hydrogen, alkyl of one to eighteen carbon atoms, phenyl, naphthyl, phenylalkyl of up to twelve carbon atoms, alkylphenylalkyl of up to twenty carbon atoms, alkoxyalkyl of three to ten carbon atoms, and alkylaminoalkyl of three to eighteen carbon atoms, $R_1$ is a hydrocarbon group of one to ten carbon atoms from the class consisting of alkyl, phenylalkyl, cycloalkyl, phenyl, naphthyl, and alkylphenyl, and D is an alkylene chain containing two to three carbon atoms between the carbon atoms to which said D is attached, the remaining valences of said two to three carbon atoms of said D are satisfied by members of the group consisting of hydrogen atoms, alkyl groups having a total carbon atom content of up to eighteen and combinations of said hydrogen atoms and said alkyl groups.

2. A method according to claim 1 in which the reaction temperature is in the range of about 0° to 100° C. and the reaction is conducted substantially at atmospheric pressure in the presence of a cyanide ion generating catalyst which is a member from the class consisting of tertiary amines, quaternary ammonium bases, alkali metals, alkali metal carbonates, and the lower alkoxides, oxides, hydroxides, peroxides, and cyanides of the alkali metals and alkaline earth metals.

3. A method according to claim 1 in which the reaction is conducted at temperatures up to 325° C. and at such super atmospheric pressures as to maintain the reactants in the liquid phase wherein the reaction is conducted in the presence of a base whose aqueous 0.1 molar solution has a pH of about at least 9.

4. A method according to claim 1 wherein the hydrocyanic acid is introduced at a rate substantially the same as the rate at which it reacts.

5. A method according to claim 1 wherein the reaction is conducted in the presence of an inert volatile organic solvent and the hydrocyanic acid is added to a mixture of said catalyst and the heterocyclic reactant.

6. A method for the preparation of a compound having the formula

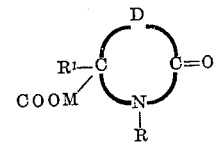

which comprises bringing together and thereby reacting at a temperature of about 30° to 150° C. until the evolution of ammonia substantially ceases, the compound having the formula

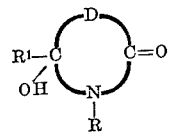

with an alkali metal cyanide in an aqueous medium in which M is an alkali metal, R is a member of the group consisting of hydrogen, alkyl of one to eighteen carbon atoms, phenyl, naphthyl, phenylalkyl of up to twelve carbon atoms, alkylphenylalkyl of up to twenty carbon atoms, alkoxyalkyl of three to ten carbon atoms, and alkylaminoalkyl of three to eighteen carbon atoms, $R^1$ is a hydrocarbon group of one to ten carbon atoms the class consisting of alkyl, phenylalkyl, cycloalkyl, phenyl, naphthyl, and alkylphenyl, and D is an alkylene chain containing two to three carbon atoms between the carbon atoms to which said D is attached, the remaining valences of said two to three carbon atoms of said D are satisfied by members of the group consisting of hydrogen atoms, alkyl groups having a total carbon atom content of up to eighteen and combinations of said hydrogen atoms and said alkyl groups.

References Cited in the file of this patent

Degering: An Outline of Organic Nitrogen Compounds, 1945 edition, page 505 (Textbook) University Lithoprinters, Ypsilanti, Michigan.

UNITED STATES PATENT OFFICE
CERTIFICATE OF CORRECTION

Patent No. 3,073,834            January 15, 1963

Newman M. Bortnick et al.

It is hereby certified that error appears in the above numbered patent requiring correction and that the said Letters Patent should read as corrected below.

Column 6, lines 58 to 63, for that portion of the formula reading $$\begin{matrix} R^1-C \\ \diagup \\ OH \end{matrix} \quad \text{read} \quad \begin{matrix} R^1-C \\ \diagup \\ CN \end{matrix}$$

Signed and sealed this 6th day of August 1963.

(SEAL)
Attest:

ERNEST W. SWIDER
Attesting Officer

DAVID L. LADD
Commissioner of Patents